UNITED STATES PATENT OFFICE.

RUDOLF BERENDES, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PROCESS FOR PRODUCING THE CALCIUM SALT OF ACETYL SALICYLIC ACID.

1,020,182.      Specification of Letters Patent.      Patented Mar. 12, 1912.

No Drawing.      Application filed September 13, 1911. Serial No. 649,145.

*To all whom it may concern:*

Be it known that I, RUDOLF BERENDES, doctor of philosophy, chemist, citizen of the German Empire, residing at Elberfeld, Germany, have invented new and useful Improvements in New Processes for Producing the Calcium Salt of Acetyl Salicylic Acid, of which the following is a specification.

My invention relates to a new process for producing the calcium salt of acetyl salicylic acid having most probably the formula:

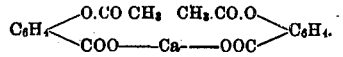

This process consists in treating acetyl salicylic acid with an alcoholate of calcium.

In order to illustrate the new process more fully the following example is given, the parts being by weight:—20 parts of calcium are heated with 2000 parts of ethylalcohol and the resulting solution is added to a solution of 180 parts of acetyl salicylic acid in 1500 parts of ethylalcohol. The calcium compound is filtered off and dried. It crystallizes from alcohol in the shape of colorless almost tasteless needles which are easily soluble in water furnishing a neutral solution. A yellowish-gray precipitate is obtained with ferric chlorid. It is a valuable soluble substitute for acetyl salicylic acid.

I claim:—

The herein described process for producing the calcium salt of acetyl salicylic acid, which process consists in treating acetyl salicylic acid with a calcium alcoholate, substantially as described.

In testimony whereof I have hereunto set my hand in the presence of two subscribing witnesses.

RUDOLF BERENDES. [L. S.]

Witnesses:
    L. NUFER,
    A. NUFER.